(12) United States Patent
Schlameuss et al.

(10) Patent No.: US 11,055,424 B2
(45) Date of Patent: Jul. 6, 2021

(54) I/O ENCRYPTION DEVICE PROTECTED AGAINST MALICIOUS HYPERVISORS

(71) Applicant: International Business Machines Corporation, Armonk, NY (US)

(72) Inventors: Christoph Vincent Schlameuss, Waldenbuch (DE); Christoph Raisch, Gerlingen (DE); Carsten Otte, Stuttgart (DE); Marco Kraemer, Sindelfingen (DE); Jakob Christopher Lang, Tuebingen (DE); Stefan Roscher, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 385 days.

(21) Appl. No.: 16/217,576

(22) Filed: Dec. 12, 2018

(65) Prior Publication Data

US 2020/0193039 A1 Jun. 18, 2020

(51) Int. Cl.
*H04L 9/08* (2006.01)
*G06F 9/455* (2018.01)
*G06F 21/62* (2013.01)

(52) U.S. Cl.
CPC .......... *G06F 21/62* (2013.01); *G06F 9/45558* (2013.01); *H04L 9/0891* (2013.01); *H04L 9/0897* (2013.01); *G06F 2009/45579* (2013.01)

(58) Field of Classification Search
None
See application file for complete search history.

(56) References Cited

U.S. PATENT DOCUMENTS

| 9,317,316 | B2 | 4/2016 | Liu |
| 9,710,400 | B2 | 7/2017 | Chaturvedi et al. |
| 9,722,788 | B1 | 8/2017 | Natanzon et al. |
| 9,735,962 | B1 | 8/2017 | Yang et al. |

(Continued)

OTHER PUBLICATIONS

Dell EMC cloudlink®, "Key Management and Encryption for Private, Public, and Hybrid Clouds", Dell Inc., Solution Brief H14453.2, Apr. 2017 (3 pages).

(Continued)

*Primary Examiner* — Joseph P Hirl
*Assistant Examiner* — Hassan Saadoun
(74) *Attorney, Agent, or Firm* — Cantor Colburn LLP; Steven Chiu

(57) ABSTRACT

A cloud computing system includes a virtual server outputs non-encrypted data and receives encrypted data in response to receiving a write request signal and a read request signal. A hosting server hypervisor receives the write request signal and the read request signal. In response to receiving the write request signal the hosting server hypervisor writes encrypted data corresponding to the write request signal into a storage device. In response to receiving the read request signal the hosting server hypervisor obtains encrypted data corresponding to a data read request signal from the storage device and outputs the encrypted data. A secure channel sub-system is installed between the at least one virtual server and the hosting server hypervisor. The secure channel sub-system stores a virtual device key in a key storage unit and prevents the virtual server and the hosting server hypervisor from accessing the key

20 Claims, 11 Drawing Sheets

(56) References Cited

U.S. PATENT DOCUMENTS

| | | |
|---|---|---|
| 9,740,880 B1 | 8/2017 | Natanzon et al. |
| 10,223,538 B1* | 3/2019 | Cignetti .............. G06F 9/45558 |
| 2018/0034787 A1* | 2/2018 | Kamaraju ........... H04L 67/1097 |
| 2019/0034643 A1* | 1/2019 | Kludy ................... G06F 21/602 |

OTHER PUBLICATIONS

Tsirkin, et al., "OASIS Virtual I/O Device (VIRTIO) TC," https://www.oasis-open.org/committees/tc_home.php?wg_abbrev=virtio (retrieved Dec. 11, 2018) 3 pages.

John M., "Code Sample: Intel® Software Guard Extensions Remote Attestation End-to-End Example," https://software.intel.com/en-us/articles/intel-software-guard-extensions-remote-attestation-end-to-end-example#remote-attestation-flow, Jul. 4, 2018 (retrieved Dec. 11, 2018) 24 pages.

\* cited by examiner

I/O ENCRYPTION DEVICE PROTECTED AGAINST MALICIOUS HYPERVISORS

BACKGROUND

The invention relates generally to cloud computing environments, and more particularly, to virtualized encrypted data storage in cloud computing environments.

Cloud computing environments include several virtual servers connected to one another. Each server may be logically partitioned into a plurality of virtual clients which act and appear to a computer connected to the server as if the virtual client is itself a physical server. Each virtual server has access to physical storage external to the server through a storage area network (SAN), for example.

Various virtualized encrypted storage services have been developed, which encrypt data stored and transferred within a cloud computing environment to preserve the confidentiality of the original data. The encryption of data typically involves converting data to an unintelligible form called ciphertext, which cannot be read unless a virtual device key is used to decrypt the data. In some types of encryption schemes, the same key also is used to encrypt the data before it is stored in the cloud computing environment. Encryption also can be an important way to protect data in transition such as the electronic and physical movement of data for backup, data recovery, and/or maintenance purposes.

SUMMARY

According to a non-limiting embodiment, a cloud computing system includes at least one virtual server configured to receive one or both of a write request signal and a read request signal, wherein in response to receiving the write request signal the at least one virtual server outputs non-encrypted data, and in response to receiving the read request signal the at least one virtual server receives decrypted data. A hosting server hypervisor is configured to receive the write request signal and the read request signal, wherein in response to receiving the write request signal the hosting server hypervisor writes encrypted data corresponding to the write request signal into a storage device. In response to receiving the read request signal the hosting server hypervisor obtains encrypted data corresponding to a data read request signal from the storage device and outputs the encrypted data. A secure channel sub-system is installed between the at least one virtual server and the hosting server hypervisor. The secure channel sub-system is configured to store at least one virtual device key in a key storage unit and to prevent both the at least one virtual server and the hosting server hypervisor from accessing the key storage unit.

According to another non-limiting embodiment, a method is provided to secure data exchanged in a cloud computing system. The method comprises receiving, by at least one virtual server, one or both of a write request signal and a read request signal. The at least one virtual server outputs non-encrypted data in response to receiving the write request signal the virtual server, and receives decrypted data in response to receiving the read request signal the virtual server. The method further comprises receiving, by a hosting server hypervisor, the write request signal and the read request signal. The hosting server hypervisor writes encrypted data corresponding to the write request signal into a storage device in response to receiving the write request signal the hosting server hypervisor, and obtains encrypted corresponding to a data read request signal from the storage device and outputs the outputs the encrypted data in response to receiving the read request signal the hosting server hypervisor. The method further comprises storing, by a secure channel sub-system installed between the virtual server and the hosting server hypervisor, at least one virtual device key, and preventing, by the secure channel sub-system, both the virtual server and the hosting server hypervisor from accessing a key storage unit.

According to still another non-limiting embodiment, a computer program product is provided. The computer program product includes a computer readable storage medium having program instructions embodied therewith. The program instructions are executable by a computer processor to cause the computer processor to perform a method of securing data exchanged in a cloud computing system. The method includes receiving, by at least one virtual server, one or both of a write request signal and a read request signal. The at least one virtual server outputs non-encrypted data in response to receiving the write request signal the virtual server, and receives decrypted data in response to receiving the read request signal the virtual server. The method further comprises receiving, by a hosting server hypervisor, the write request signal and the read request signal. The hosting server hypervisor writes encrypted data corresponding to the write request signal into a storage device in response to receiving the write request signal the hosting server hypervisor, and obtains encrypted corresponding to a data read request signal from the storage device and outputs the encrypted data in response to receiving the read request signal the hosting server hypervisor. The method further comprises storing, by a secure channel sub-system installed between the virtual server and the hosting server hypervisor, at least one virtual device key, and preventing, by the secure channel sub-system, both the virtual server and the hosting server hypervisor from accessing a key storage unit.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Figure 1:
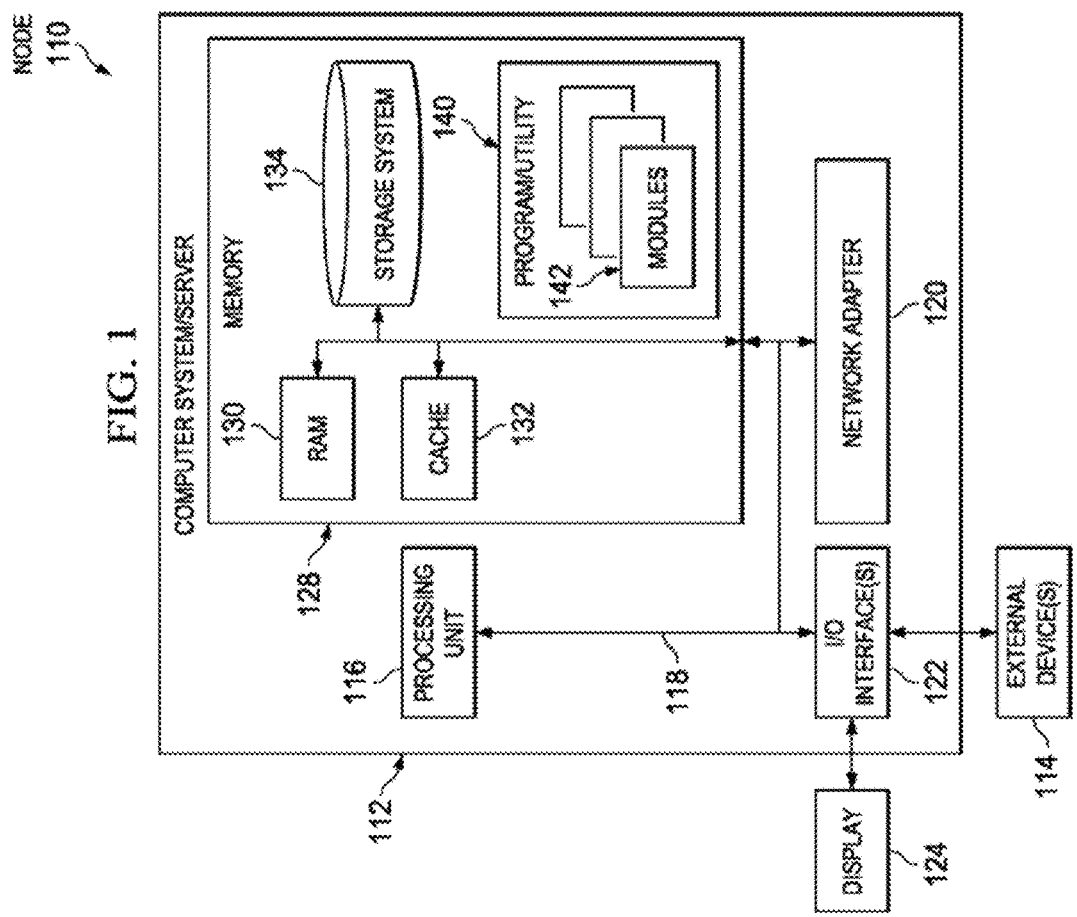
FIG. 1 depicts a schematic diagram of a cloud computing node in accordance with a non-limiting embodiment.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, current cloud computing environments experience problems when handling security keys associated with virtualized encrypted storage. For example, data encryption in a cloud computing environment is currently either executed within a virtual server (where the virtual server owner has access to the encryption keys), within a hypervisor layer (where the hypervisor owner has access to the encryption keys), or in a hardware component in an I/O adapter (where virtual devices are not visible anymore as individual devices). The scenarios above, however, are susceptible to security risks. For example, installing an encryption layer in the hosting server hypervisor allows a hypervisor administrator unauthorized access to data without the knowledge of the service administrator. To prevent unauthorized access by the hypervisor administrator unauthorized, the encryption layer can be installed in the virtual server. This scenario, however, requires the service administrator of the virtual server to manage the encryption key, thereby allowing for the risk of human error.

In addition, it may be desirable to transfer (i.e., migrate) a running client partition or other data from one virtual server to another virtual server. This migration process may be performed, for example, to balance a load among the servers or for maintenance purposes. When performing data migration, it is desirable to ensure data migration is performed in a secure environment and to ensure the association of a virtual device key is securely transferred from the previous virtual server to the new virtual server.

Various non-limiting embodiments provide a cloud computing system that implements an encryption layer between a virtual server and a hypervisor. Unlike conventional cloud computing environments, the encryption keys employed in the cloud computing system according to various non-limiting embodiments described herein can be controlled by a separate key administrator independent from a virtual server administrator and/or a hypervisor administrator. Accordingly, the cloud computing system provided by various embodiments described herein is capable of managing virtualized storage resource encryptions within the cloud environments to match typical customer security workflows.

Referring now to FIG. 1, a schematic of an example of a cloud computing node is depicted in accordance with an illustrative embodiment. Cloud computing node 110 is only one example of a suitable cloud computing node and is not intended to suggest any limitation as to the scope of use or functionality of the illustrative embodiments described herein. Regardless, cloud computing node 110 is capable of being implemented and/or performing any of the functionality set forth hereinabove.

In cloud computing node 110 there is computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing systems that include any of the above systems or devices and the like.

Computer system/server 112 may be described in the general context of computer system executable instructions, such as program modules being executed by a computer system. Generally, program modules may include routines, programs, objects, components, logic, data structures, and so on that perform particular tasks or implement particular abstract data types. Computer system/server 112 may be practiced in distributed cloud computing systems where tasks are performed by remote processing devices that are linked through a communications network. In a distributed cloud computing system, program modules may be located in both local and remote computer system storage media including memory storage devices.

As shown in FIG. 1, computer system/server 112 in cloud computing node 110 is shown in the form of a general purpose computing device. The components of computer system/server 112 may include, but are not limited to, one or more processors or processor unit 116, system memory 128, and bus 118 that couples various system components including system memory 128 to processor unit 116.

Processor unit 116 executes instructions for software that may be loaded into system memory 128. Processor unit 116 may be a number of processors, a multi-processor core, or some other type of processor, depending on the particular implementation. A number, as used herein with reference to an item, means one or more items. Further, processor unit 116 may be implemented using a number of heterogeneous processor systems in which a main processor is present with secondary processors on a single chip. As another illustrative example, processor unit 116 may be a symmetric multi-processor system containing multiple processors of the same type.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112 and it includes volatile media, non-volatile media, removable media, and non-removable media.

System memory 128 can include computer system readable media in the form of volatile memory, such as random access memory (RAM) 130 and/or cache memory 132. Computer system/server 112 may further include other removable/non-removable and volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the illustrative embodiments.

Program/utility 140, having a set (at least one) of program modules 142, may be stored in memory 128 by way of example and not limitation, as well as an operating system, one or more application programs, other program modules, and program data. Each of the operating systems, one or more application programs, other program modules, and program data or some combination thereof, may include an implementation of a networking environment. Program modules 142 generally carry out the functions and/or methodologies of the illustrative embodiments as described herein.

Computer system/server 112 may also communicate with one or more external devices 114, such as a keyboard, a pointing device, display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks, such as a local area network (LAN), a general wide area network (WAN), and/or a public network (e.g., the Internet) via network adapter 120. As depicted, network adapter 120 communicates with the other components of computer system/server 112 via bus 118. It should be understood that, although not shown, other hardware and/or software components could be used in conjunction with computer system/server 112. Examples include, but are not limited to, microcode, device drivers, redundant processor units, external disk drive arrays, RAID systems, tape drives, and data archival storage systems, etc.

Figure 2:
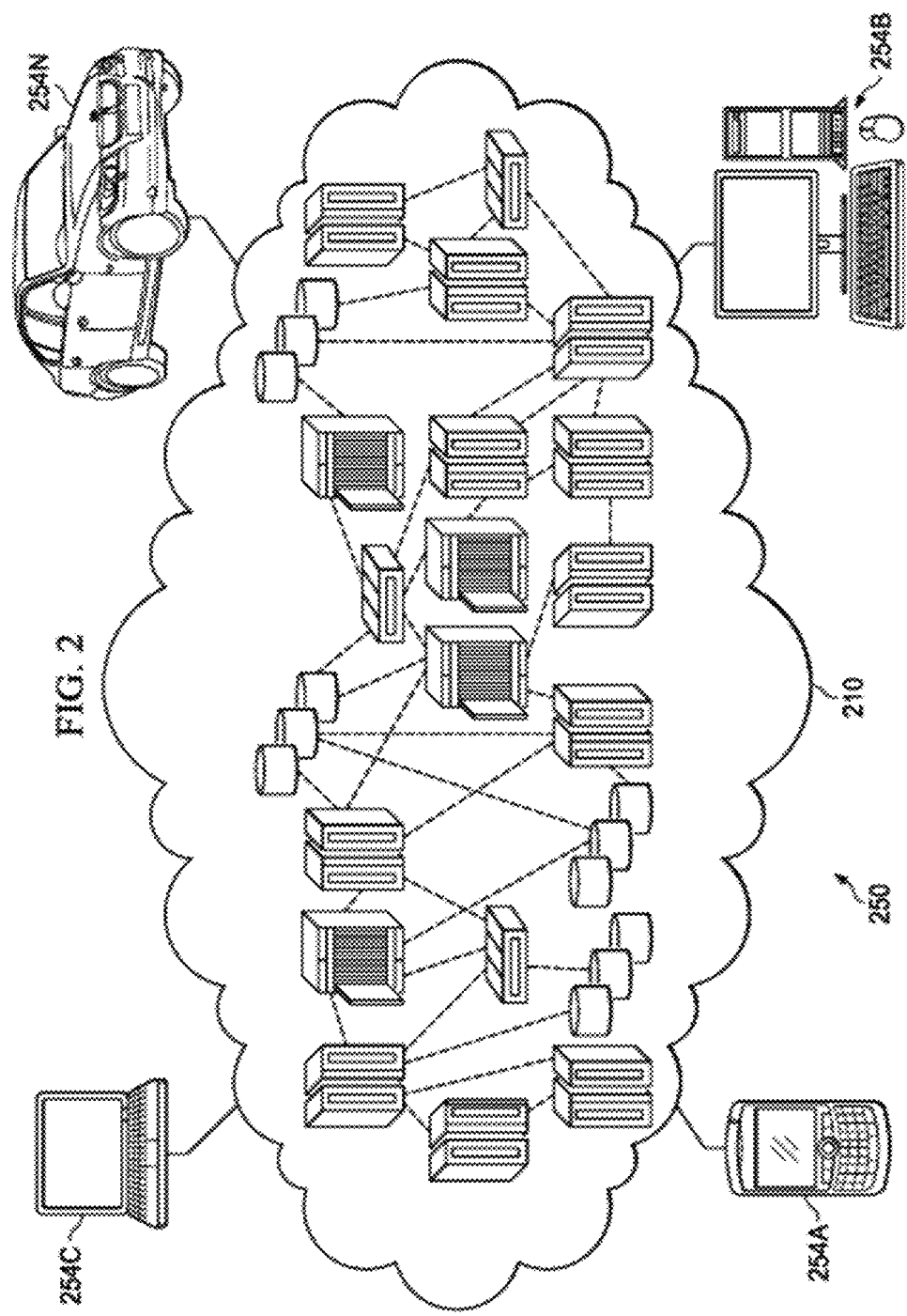
FIG. 2 illustrates of a cloud computing system according to a non-limiting embodiment.

Referring now to FIG. 2, an illustration of a cloud computing system is depicted in accordance with an illustrative embodiment. In this illustrative example, cloud computing system 250 comprises one or more cloud computing nodes 210 with which local computing devices used by cloud consumers may communicate. For example, cloud computing node 110 in FIG. 1 is one example of cloud computing nodes 210. Local computing devices which may communicate with cloud computing nodes 210 may include, for example, personal digital assistant (PDA) or cellular telephone 254A, desktop computer 254B, laptop computer 254C, and/or automobile computer system 254N. Cloud computing nodes 210 may communicate with one another. They may be grouped (not shown) physically or virtually, in one or more networks, such as private, community, public, or hybrid clouds as described hereinabove or a combination thereof. This allows cloud computing system 250 to offer infrastructure, platforms, and/or software as services for which a cloud consumer does not need to maintain resources on a local computing device. It is understood that the types of computing devices, for example, personal digital assistant (PDA) or cellular telephone 254A, desktop computer 254B, laptop computer 254C, and/or automobile computer system 254N N shown in FIG. 2 are intended to be illustrative only and that cloud computing nodes 210 and cloud computing system 250 can communicate with any type of computerized device over any type of network and/or network addressable connection (e.g., using a web browser). Program code located on one of cloud computing nodes 210 may be stored on a computer recordable storage medium in one of cloud computing nodes 210 and downloaded to a computing device within computing devices, for example, personal digital assistant (PDA) or cellular telephone 254A, desktop computer 254B, laptop computer 254C, and/or automobile computer system 254N over a network for use in these computing devices. For example, a server computer in cloud computing nodes 210 may store program code on a computer readable storage medium on the server computer. The server computer may download the program code to a client computer in computing devices, for example, personal digital assistant (PDA) or cellular telephone 254A, desktop computer 254B, laptop computer 254C, and/or automobile computer system 254N for use on the client computer.

Figure 3:
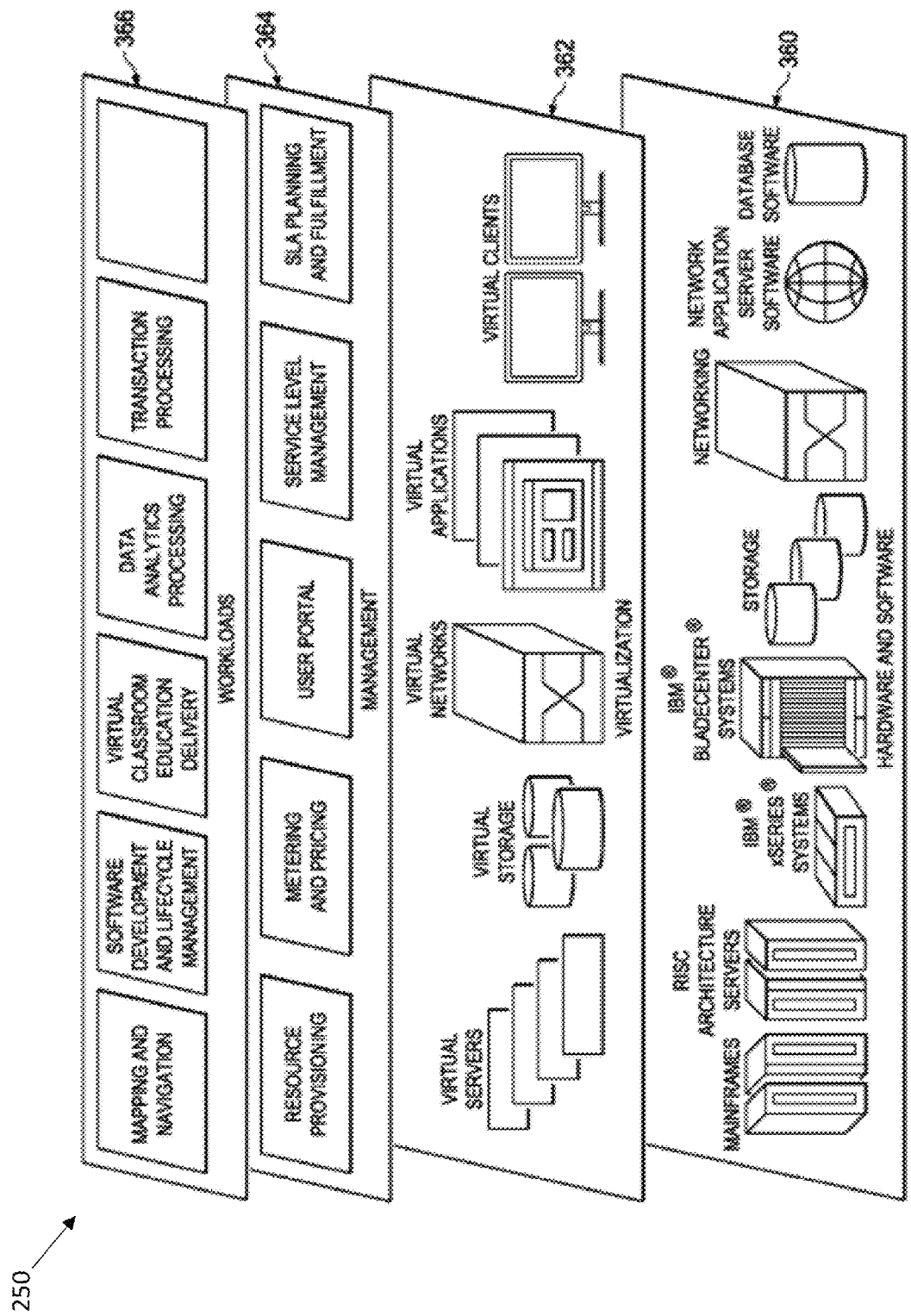
FIG. 3 illustrates a set of functional abstraction layers in accordance with a non-limiting embodiment.

Referring now to FIG. 3, a set of functional abstraction layers is depicted in accordance with an illustrative embodiment. The set of functional abstraction layers may be provided by cloud computing system 250 in FIG. 2. It should be understood in advance that the components, layers, and functions shown in FIG. 3 are intended to be illustrative only and illustrative embodiments are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM® pSeries® systems; IBM® xSeries® systems; IBM® BladeCenter® systems; storage devices; networks and networking components. Examples of software components include network application server software, in one example IBM® WebSphere® application server software; and database software, in one example IBM® DB2® database software. (IBM®, zSeries®, pSeries®, xSeries®, BladeCenter®, WebSphere®, and DB2® are trademarks of International Business Machines Corporation registered in many jurisdictions worldwide).

Virtualization layer 362 provides an abstraction layer from which the following examples of virtual entities may be provided: virtual servers; virtual storage; virtual networks including virtual private networks; virtual applications and operating systems; and virtual clients.

In one example, management layer 364 may provide the functions described below. Resource provisioning provides dynamic procurement of computing resources and other resources that are utilized to perform tasks within the cloud computing system. Metering and pricing provide usage and cost tracking as resources are utilized within the cloud computing system and billing or invoicing for consumption of these resources. In one example, these resources may comprise application software licenses. Security provides identity verification for cloud consumers and tasks as well as protection for data and other resources. User portal provides access to the cloud computing system for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 366 provides examples of functionality for which the cloud computing system may be utilized. Examples of workloads and functions which may be provided from this layer include: mapping and navigation; software development and lifecycle management; virtual classroom education delivery; data analytics processing; and transaction processing.

It is understood in advance that although this disclosure includes a detailed description on cloud computing, implementation of the teachings recited herein are not limited to a cloud computing system. Rather, embodiments of the present invention are capable of being implemented in conjunction with any other type of computing system now known or later developed.

Figure 4:
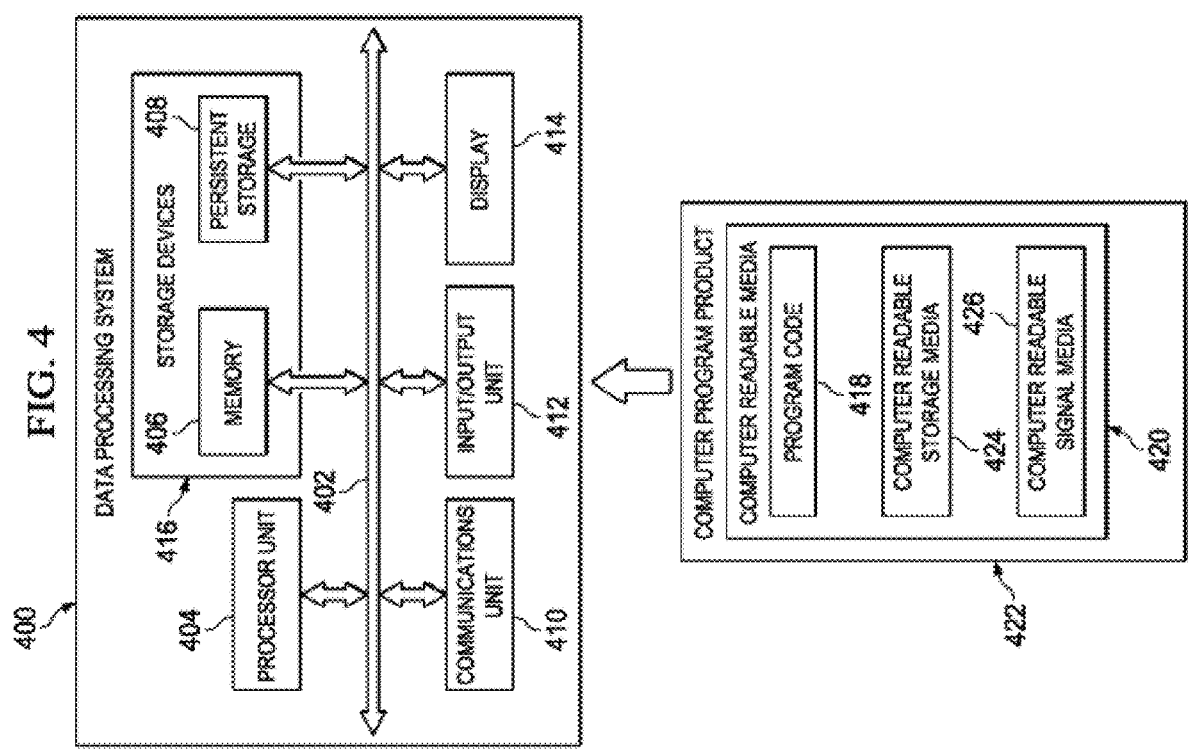
FIG. 4 illustrates a data processing system in accordance with a non-limiting embodiment.

Turning now to FIG. 4, an illustration of a data processing system is depicted in accordance with an illustrative embodiment. Data processing system 4100 may be used to implement a cloud computing system such as cloud computing system 250 of FIG. 2. In this illustrative example, data processing system 400 includes communications framework 402, which provides communications between processor unit 404, memory 406, persistent storage 408, communications unit 410, input/output (I/O) unit 412, and display 414. In these examples, communications framework 402 may be a bus system.

Processor unit 404 serves to execute instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications framework 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage media 424 or computer readable signal media 426. Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400. In these examples, computer readable storage media 424 is a physical or tangible storage device used to store program code 418 rather than a medium that propagates or transmits program code 418. Computer readable storage media 424 is also referred to as a computer readable tangible storage device or a computer readable physical storage device. In other words, computer readable storage media 424 is a media that can be touched by a person.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 418 may be omitted because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

In another example, a bus system may be used to implement communications framework 402 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 406, or a cache, such as found in an interface and memory controller hub that may be present in communications framework 402.

Figure 5:
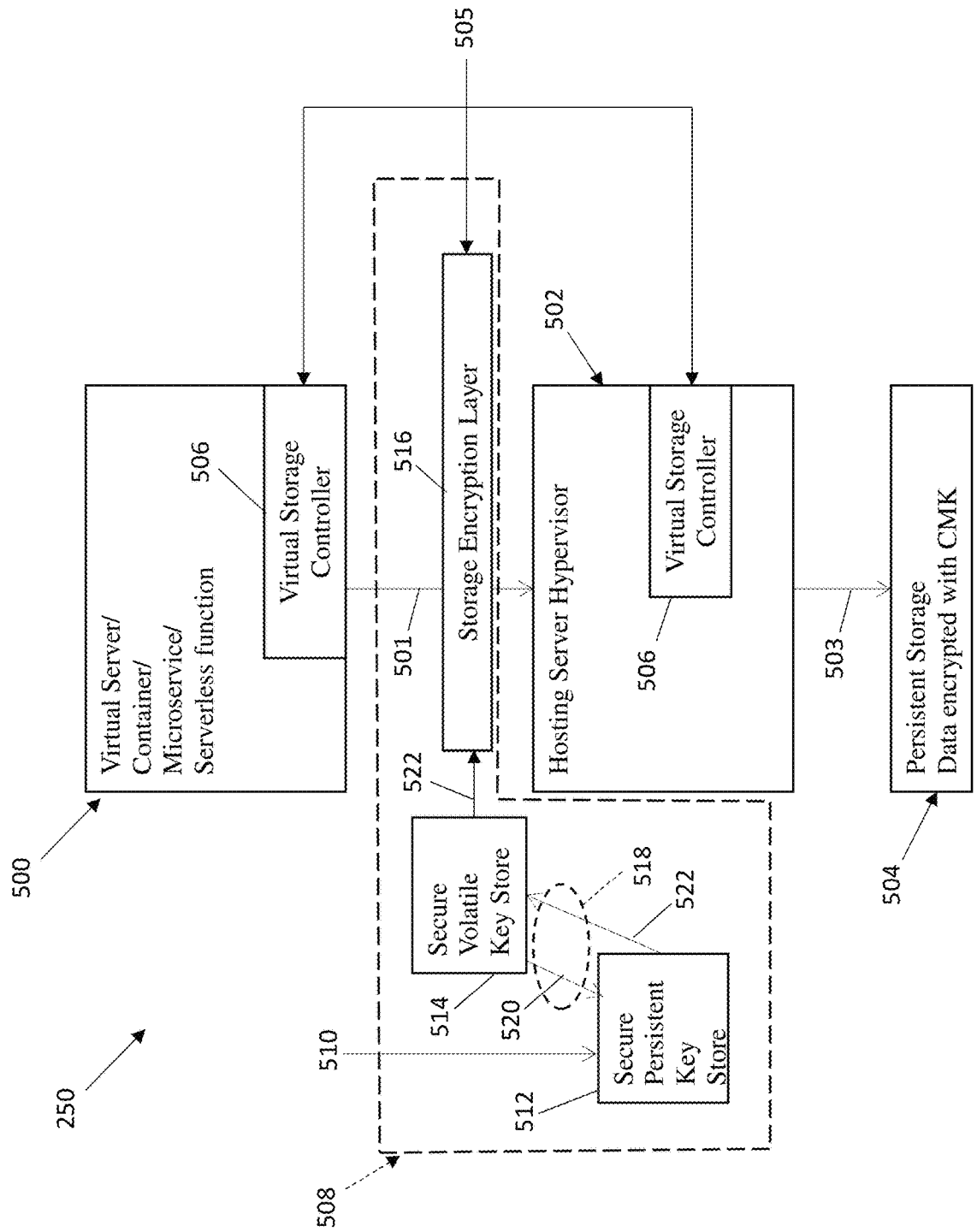
FIG. 5 illustrates a block diagram of a cloud computing system according to a non-limiting embodiment.

Turning now to FIG. 5, a cloud computing system 250 is illustrated according to a non-limiting embodiment. The cloud computing system 250 includes one or more virtual servers 500, a hosting server hypervisor 502, and a storage device 504. The cloud computing system 250 is configured to operate in either a data write mode or a data read mode. For example, a user can input a write request signal 505 indicating a request to encrypt plain input data (i.e., non-encrypted data) 501 and write the encrypted data 503 into the storage unit 504. A user can also input a read request signal 505 indicating a request to receive decrypted data 501 based on encrypted data obtained from the storage unit 504.

The virtual server 500 is configured to perform various functions by way of the execution of computer code by a virtual controller. The functions include, for example, database functions such that the virtual server operates as a database accessible by one or more computers operating in the cloud computing system. The virtual server 500 can also facilitate the sharing of physical I/O resources among various I/O devices operating in the cloud computing system 250.

In at least one non-limiting embodiment, the virtual server 500 is configured to receive the write request signal and/or the read request signal 505. In response to receiving the write request signal 505, for example, the virtual server 500 outputs plain data (i.e., non-encrypted data) 501 and receives a write completion signal indicating the plain data has been encrypted and written into storage. In response to receiving the read request signal 505, the virtual server 500 outputs a data read request signal and receives decrypted data 501.

The hosting server hypervisor 502 is configured to operate as a memory manager capable of controlling access to memory and security functions. In this manner, the hosting server hypervisor 502 can protect data in the storage unit 504 from being accessed by a one or more other virtual servers installed in the cloud computing system 250. The hosting server hypervisor 502 can also store a record of which memory of is allocated to a particular virtual server and what memory is available to be allocated to a virtual server. The hosting server hypervisor 502 can also control time slicing, management of all hardware interrupts, dynamic movement of resources across multiple operating systems, and dispatching of logical partition workloads.

In at least one embodiment, the hosting server hypervisor 502 is configured to receive the write request signal and/or the read request signal 505. In response to receiving the write request signal 505, the hosting server hypervisor 502 receives encrypted data 503 corresponding to the input plain data 501 and outputs the write completion signal to be delivered to the virtual server 500. In response to receiving the read request signal 505, the hosting server hypervisor 502 obtains the encrypted data 503 corresponding to the read request signal, which is then decrypted and delivered to the virtual server 500.

Figure 6:
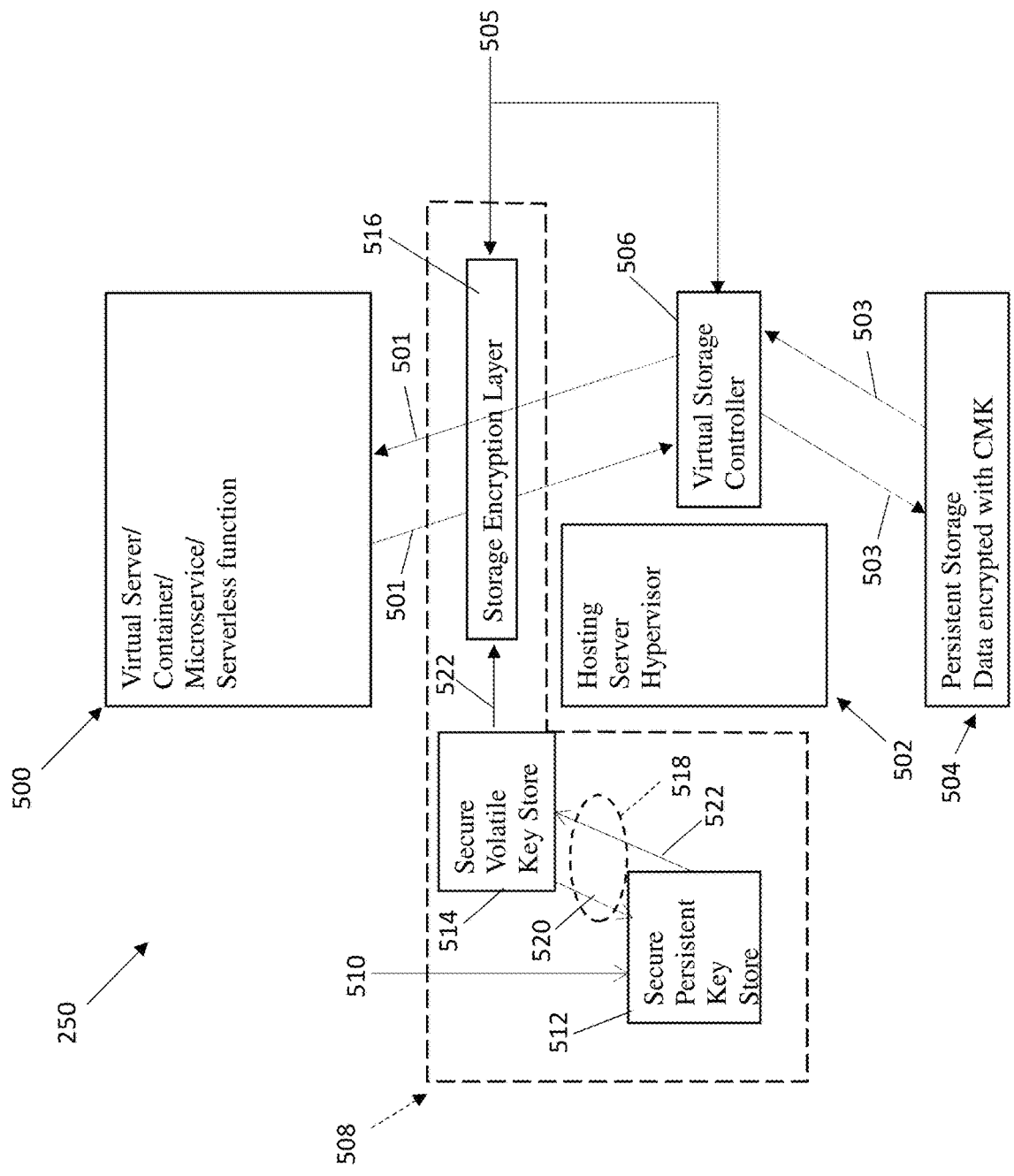
FIG. 6 illustrates a block diagram of a cloud computing system according to another non-limiting embodiment.

In one or more embodiments, the cloud computing system 250 includes a virtual storage controller 506. The virtual storage controller 506 can be configured to serve as a controller or administrator of the virtual server 500 and the hosting server hypervisor 502. The virtual storage controller 506 can be installed in the virtual server 500 and/or the hosting server hypervisor 502 (see FIG. 5). In other embodiments, the virtual storage controller 506 can be located remotely from the virtual server 500 and the hosting server hypervisor 502 (see FIG. 6). In any scenario, the virtual storage controller 506 can operate the virtual server 500, the hosting server hypervisor 502, and/or a secure channel sub-system 508 in either the data write mode to store encrypted data 503 in the storage unit 504, or the data read mode to decrypt encrypted data 503 from the storage unit 504, and to deliver the decrypted data 501 to the virtual server 500.

The cloud computing system 250 further includes a secure channel sub-system 508 installed between the virtual server 500 and the hosting server hypervisor 502. The secure channel sub-system 508 is configured to store at least one customer provided virtual device key 510 in a key storage unit and to prevent both the virtual server 500 and the hosting server hypervisor 502 from accessing the key storage unit. In at least one non-limiting embodiment, the secure channel sub-system 508 includes a secure key persistent storage unit 512, a secure key volatile storage unit 514, and a storage encryption layer 516. The secure key persistent storage unit 512 and the secure key volatile storage unit 514 together form the key storage unit, which can be protected from access by the virtual server 500 and the hosting server hypervisor 502.

The secure key persistent storage unit 512 is configured to store one or more virtual device keys 510 received from a customer. The secure key volatile storage unit 514 is in signal communication with the secure key persistent storage unit 512 via a secure data channel 518.

The secure key volatile storage unit 514 is configured to obtain a stored virtual device key 510 from the secure key persistent storage unit 512 in response receiving the data write request signal or the data read request signal. In at least one embodiment, the secure key persistent storage unit 512 stores original versions the customer provided virtual device keys 510, while the secure key volatile storage unit 514 temporarily stores a copy of a virtual device key 522 that corresponds with a write request or read request indicated by the request signal 505.

The storage encryption layer 516 indicates a data write request or data read request to the secure key volatile storage unit 514 in order to obtain the virtual device key 522 associated with data corresponding to write/read request. For example, the secure key volatile storage unit 514 outputs a device key request signal 520 based on the data request signal 505. In response to the device key request signal 520, the secure key persistent storage unit 512 outputs a corresponding virtual device key 522 to the secure key volatile storage unit 514, which is then relayed to the storage encryption layer 516.

In at least one embodiment, the storage encryption layer 516 is configured to encrypt the plain data 501 (i.e., non-encrypted data) corresponding to a write request using the obtained virtual device key 522 and writes the encrypted data 503 into the storage device 504. The storage encryption layer 516 is also configured to obtain encrypted data 503 from the storage device 504, which corresponds to a read request, decrypt the obtained encrypted data 503 using the virtual device key 522, and output the decrypted data 501 to the virtual server 500.

In one or more embodiments, the storage encryption layer 516 also performs various security measures. The security measures include, but are not limited to, blocking the hosting server hypervisor 502 from analyzing the data exchange between the storage encryption layer 516 and the virtual server 500, blocking other virtual servers installed in the cloud computing system 250 from analyzing the data exchange between the storage encryption layer 516 and the virtual server 500, and blocking other devices installed in the cloud computing system 250 from analyzing the data exchange between the secure key volatile storage unit 514 and the storage encryption layer 516. The storage encryption layer 516 is also capable of detecting an attempt by the hosting server hypervisor 502 to change a configuration between the storage encryption layer 516 and the virtual server 500, and blocking any communication associated with the detected configuration change until authorization from the security administrator and/or the virtual server 500.

Figure 7:
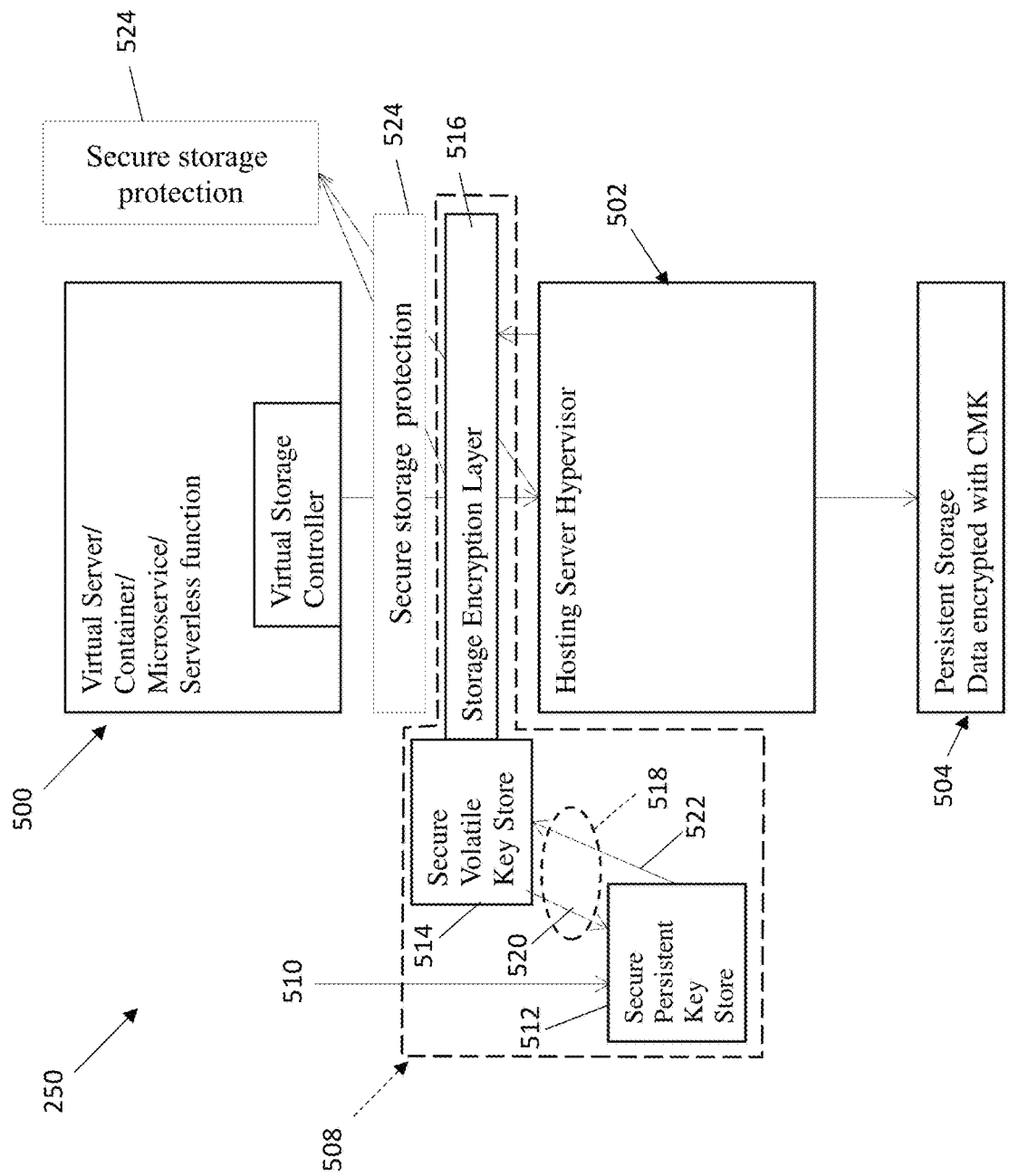
FIG. 7 illustrates a block diagram of a cloud computing system according to another non-limiting embodiment.

In at least one embodiment, the cloud computing system 250 can further include one or more secure storage protection units 524 (see FIG. 7). The secure storage protection units 524 may provide improved data security for data stored on physical storage devices. For example, data can be by cryptographically split and stored on physical devices, such that generally each device contains only a portion of the data required to reconstruct the originally stored data, and that portion of the data is a block-level portion of the data encrypted to prevent reconstitution by unauthorized users.

Through use of the secure storage protection units 524, a plurality of physical storage devices can be mapped to a single volume, and that volume can be presented as a virtual disk for use by one or more groups of users. The secure storage protection units 524 can allow a user to have an arrangement other than one-to-one correspondence between storage drives and physical storage devices. By distributing volumes across multiple disks, security can be enhanced because copying or stealing data from a single physical disk will generally be insufficient to access that data (i.e. multiple disks of data, as well as separately-held encryption keys, must be acquired).

Figure 8:
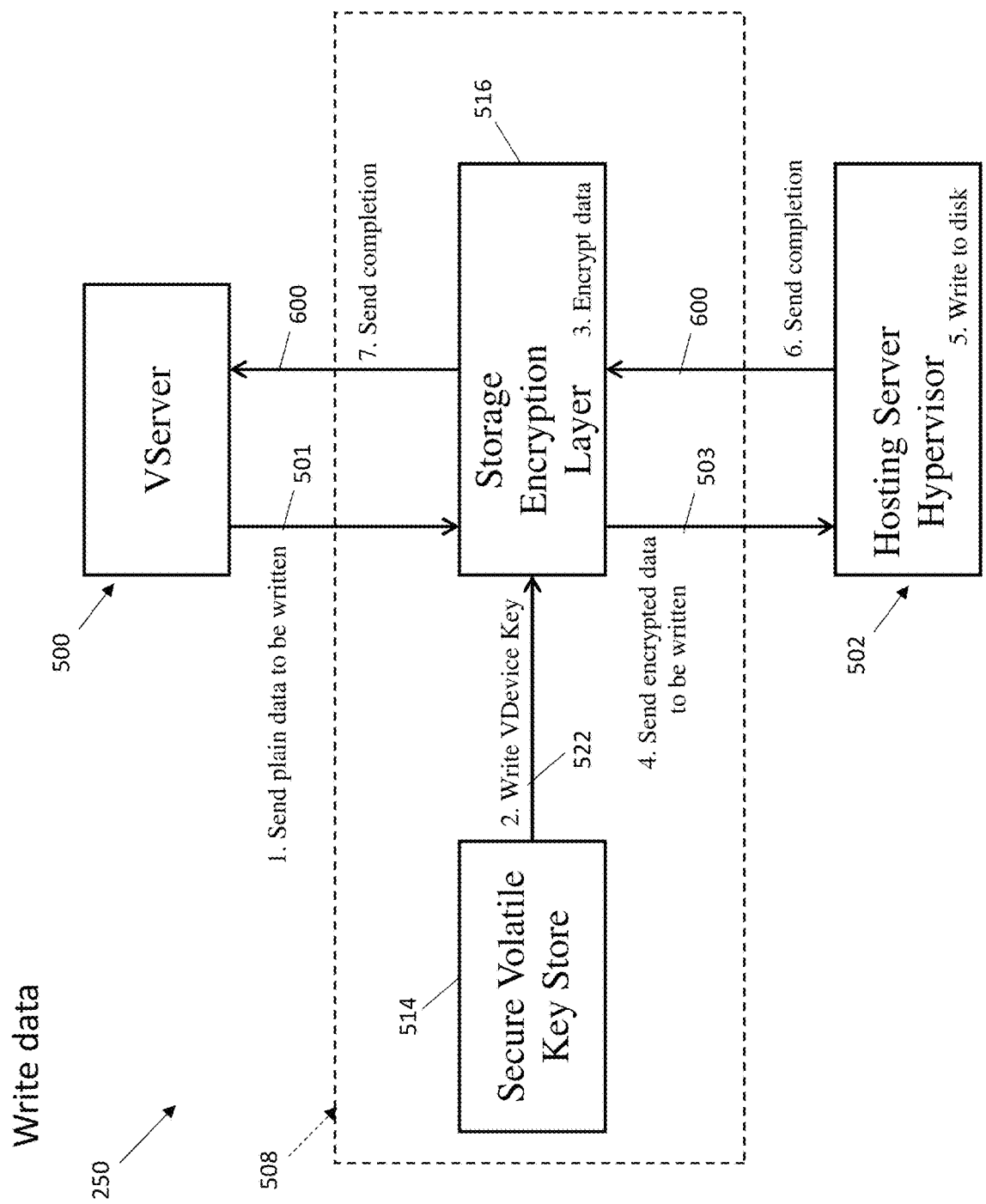
FIG. 8 depicts a data exchange corresponding to a data write mode of the cloud computing system according to a non-limiting embodiment.

With reference now to FIG. 8, the data exchange corresponding to the data write mode of the cloud computing system 250 is illustrated according to a non-limiting embodiment. In response to invoking the data write mode, the virtual server 500 outputs plain data 501 (e.g., non-encrypted data) to be encrypted and written into a storage unit at operation (1). At operation (2), the secure key volatile storage unit 514 obtains the virtual device key 522 corresponding to the plain data 501 and relays it to the storage encryption layer 516. At operation (3), the storage encryption layer 516 encrypts the plain data 501 using the virtual device key 522 and outputs the corresponding encrypted data 503 at operation (4). At operation (5), the hosting server hypervisor 502 writes the encrypted data 503 into storage (e.g., storage unit 504), and outputs a write completion signal 600 at operation (6). At operation (7), the write completion signal 600 is relayed to the virtual server 500, which can then generate a notification indicating that the plain data 501 has been successfully encrypted and written into storage.

Figure 9:
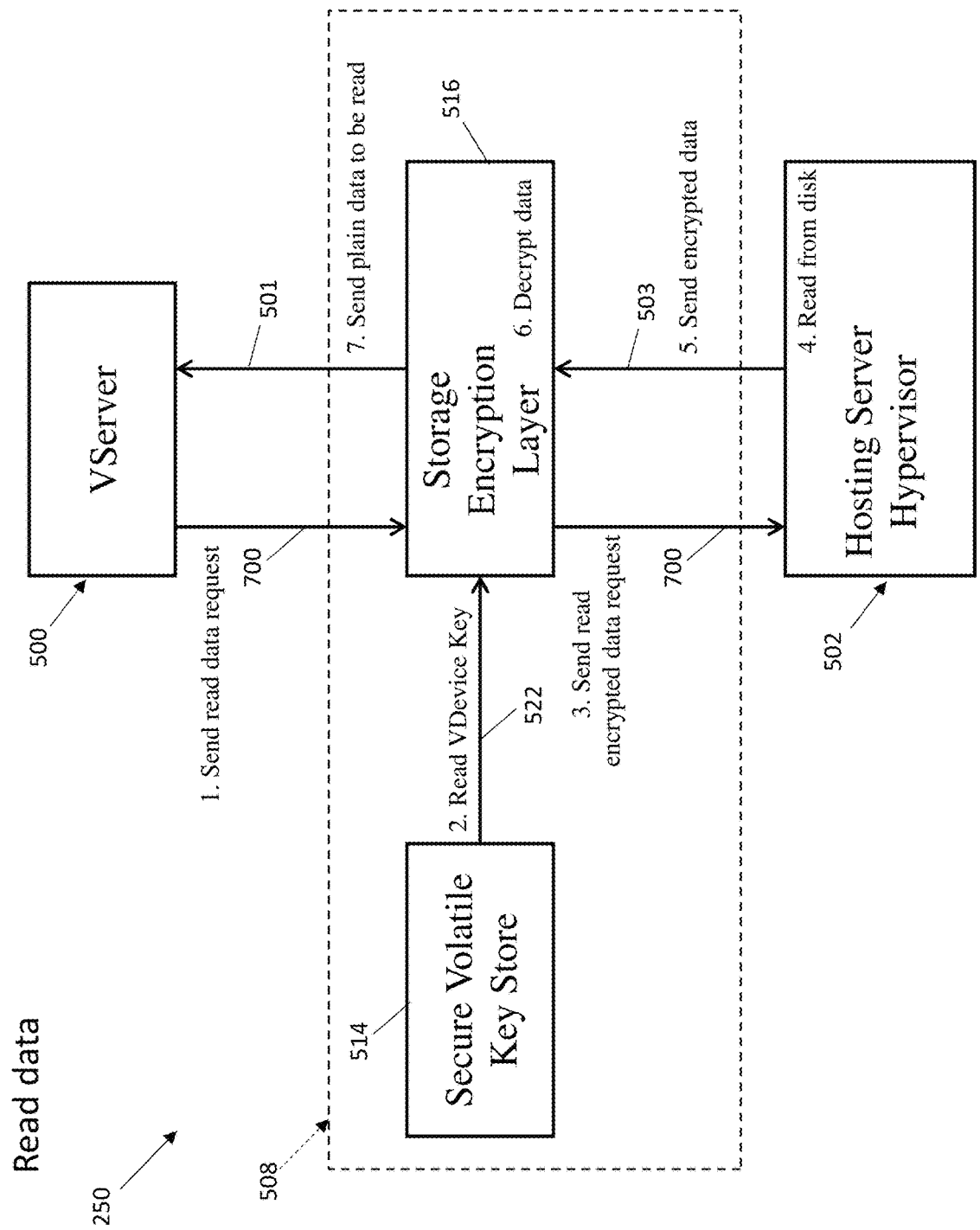
FIG. 9 depicts a data exchange corresponding to a data read mode of the cloud computing system according to a non-limiting embodiment.

Turning to FIG. 9, the data exchange corresponding to the data read mode of the cloud computing system 250 is illustrated according to a non-limiting embodiment. In response to invoking the data read mode, the virtual server 500 outputs data read request signal 700 at operation (1). At operation (2), the secure key volatile storage unit 514 obtains the virtual device key 522 corresponding to the data to be read (i.e., corresponding to the data read request), and relays it to the storage encryption layer 516. At operation (3), the storage encryption layer 516 relays the data read request signal 700 to the hosting server hypervisor 502. At operation (4), the hosting server hypervisor 502 obtains the encrypted data 503 corresponding to the data read request and relays it to the storage encryption layer 516 at operation (5). At operation (6), the hosting server hypervisor 502 decrypts the encrypted data 503 using the virtual device key 522 and outputs the corresponding plain data 501 to the virtual server 500 at operation (7).

Figure 10:
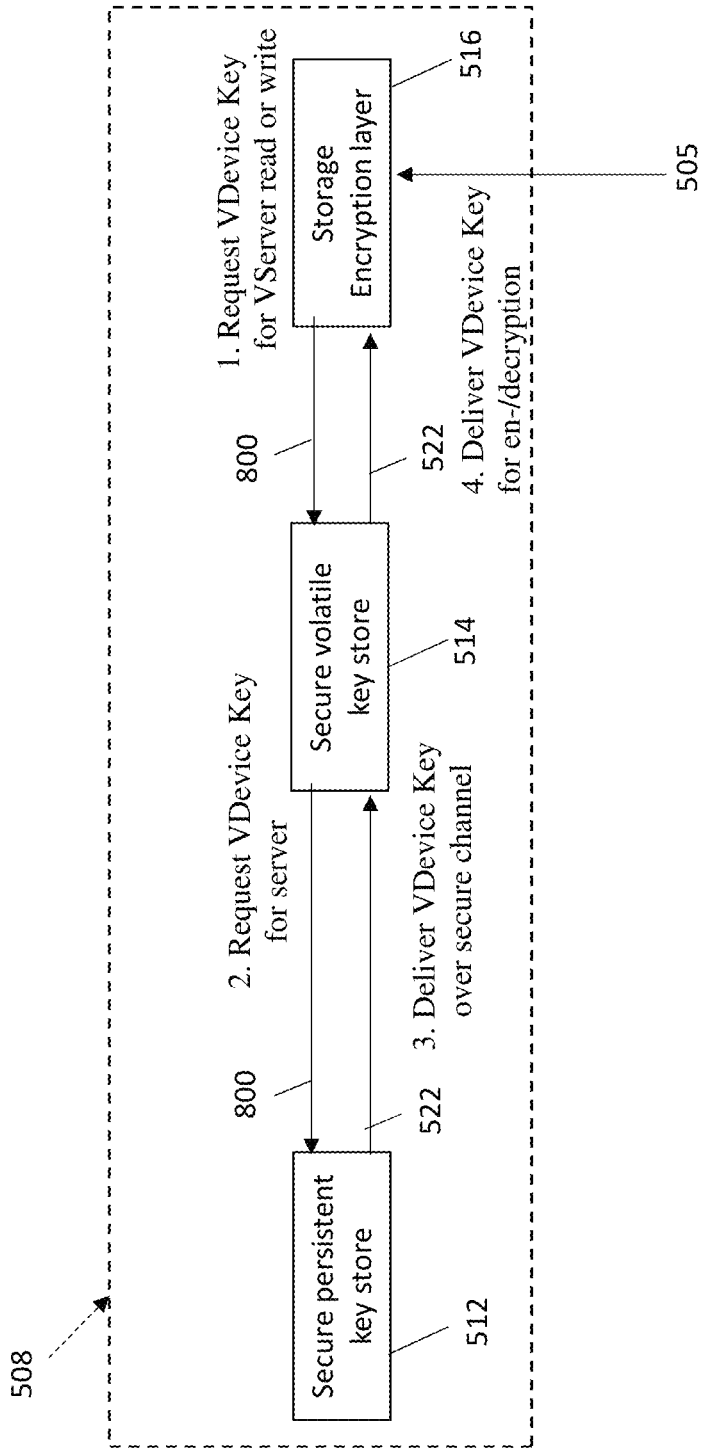
FIG. 10 depicts a data exchange to deliver a virtual device key for performing either data encryption or data decryption according to a non-limiting embodiment.

FIG. 10 illustrates an example of the data exchange to deliver a virtual device key 522 for performing either data encryption or data decryption according to a non-limiting embodiment. In response to receiving the data request signal 505, the storage encryption layer 516 outputs a key request signal 800 requesting a virtual device key at operation (1). The requested virtual device key is associated with the data corresponding to a data write request or a data read request. In one or more embodiments, the data request signal 505 can include an identifier indicating the data associated with the corresponding data write request or a data read request. At operation (2), the key request signal 800 is relayed to the secure key persistent storage unit 512. In response to the key request signal 800, the secure key persistent storage unit 512 outputs the virtual device key 522 corresponding to the data write request or data read request at operation (3). In at least one embodiment, the output virtual device key 522 is a copy of an original customer provided virtual device key that is stored in the secure key persistent storage unit 512. At operation (4), the virtual device key 522 is relayed from the volatile storage unit 514 to the storage encryption layer 516 at operation (4). Accordingly, the storage encryption layer 516 can use the obtained virtual device key 522 to encrypt or decrypt data corresponding to data write request or a data read request, respectively.

Figure 11:
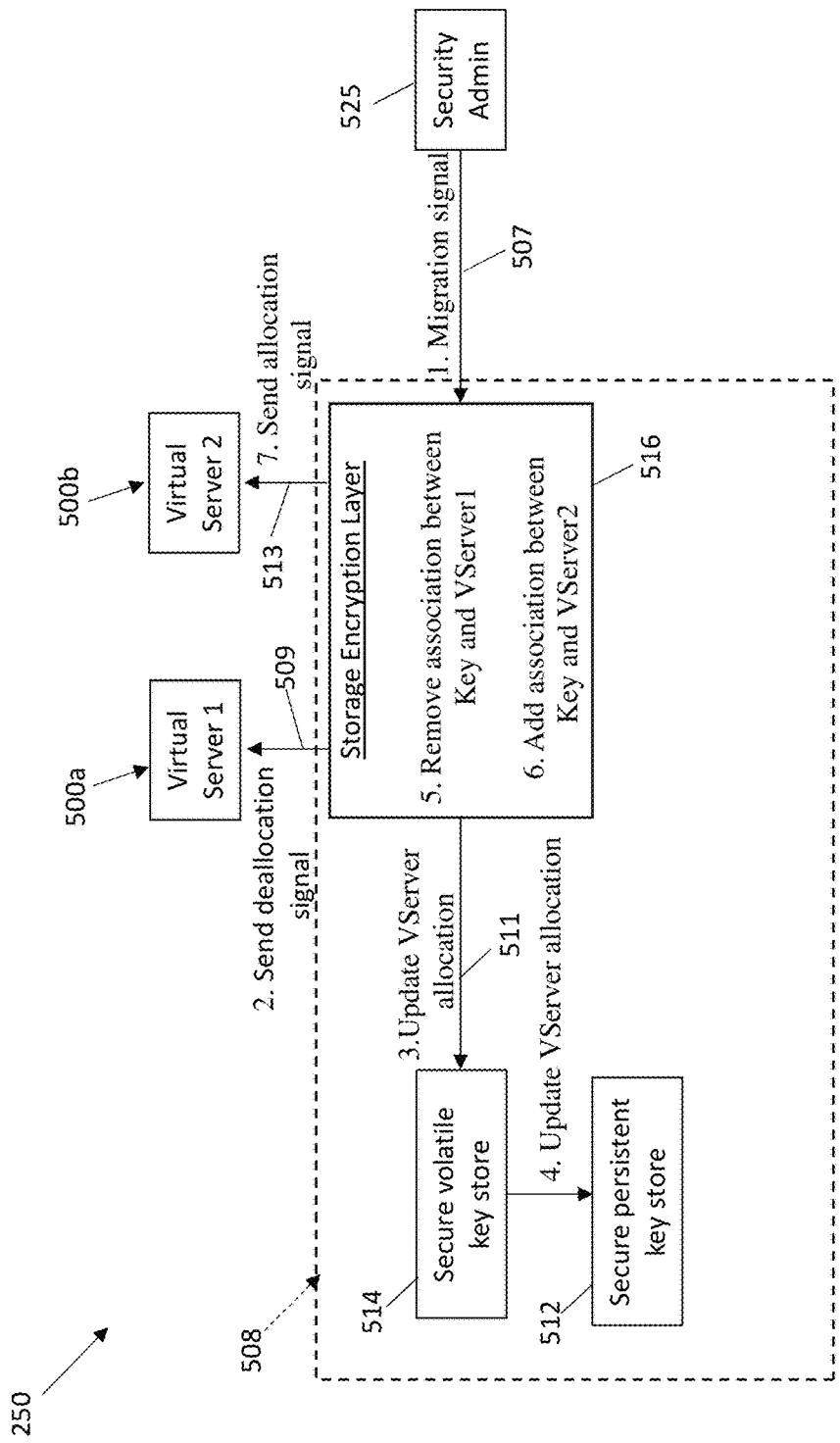
FIG. 11 is a block diagram illustrating the cloud computing system operating in a device migration mode according to a non-limiting embodiment.

In at least one embodiment, the cloud computing system 250 can operate according to a device migration mode. Turning to FIG. 11, for example, the storage encryption layer 516 invokes the device migration mode to perform a data migration from a first virtual server 500a to a second virtual server 500b in response to receiving a migration activation signal 507. The migration activation signal 507 can be input from a security administrator 525, for example. In response to invoking the device migration mode, the storage encryption layer 516 outputs a signal deallocation signal 509 and server update signal 511.

During device migration mode, the storage encryption layer 516 removes a key association between a virtual device key and the first virtual server 500a and establishes a new key association between the virtual device key and the second virtual server 500b. Following completion of the new key association, the storage encryption layer 516 outputs an allocation complete signal 513 to the second virtual server 500b indicating completion of the new key association. In addition, the secure key persistent storage unit 512 updates the virtual server allocation in response to receiving the server update signal 511.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A cloud computing system comprising:
   at least one virtual server configured to receive one or both of a write request signal and a read request signal, wherein in response to receiving the write request signal the at least one virtual server outputs non-encrypted data, and in response to receiving the read request signal the at least one virtual server receives decrypted data;
   a hosting server hypervisor configured to receive the write request signal and the read request signal, wherein in response to receiving the write request signal the hosting server hypervisor writes encrypted data corresponding to the write request signal into a storage device, and wherein in response to receiving the read request signal the hosting server hypervisor obtains encrypted data corresponding to a data read request signal from the storage device and outputs the encrypted data; and
   a secure channel sub-system installed between the at least one virtual server and the hosting server hypervisor, the secure channel sub-system configured to store at least one virtual device key in a key storage unit and to prevent both the at least one virtual server and the hosting server hypervisor from accessing the key storage unit.

2. The cloud computing system of claim 1, wherein the secure channel sub-system includes the key storage unit, and the key storage unit comprises:
   a secure key persistent storage unit configured to store the at least one virtual device key received from a customer;

a secure key volatile storage unit in signal communication with the secure key persistent storage unit via a secure data channel, the secure key volatile storage unit configured to obtain the at least one virtual device key from the secure key persistent storage unit; and a storage encryption layer configured to relay the data write request signal or the data read request signal to the secure key volatile storage unit so as to obtain the virtual device key therefrom.

3. The cloud computing system of claim 2, wherein the storage encryption layer encrypts the non-encrypted data using the virtual device key to generate the encrypted data corresponding to the data write request.

4. The cloud computing system of claim 3, wherein the storage encryption layer delivers the encrypted data corresponding to the data write request to the hosting server hypervisor, and wherein the hosting server hypervisor writes the encrypted data into the storage device.

5. The cloud computing system of claim 3, wherein the storage encryption layer obtains the encrypted data corresponding to the data read request from the host system hypervisor, and wherein the host system hypervisor reads the encrypted data from the storage device and decrypts the encrypted data using the virtual device key to generate the decrypted data.

6. The cloud computing system of claim 2, wherein the storage encryption layer invokes a device migration mode to perform a data migration from a first virtual server to a second virtual server different from the first virtual server in response to receiving a migration activation signal.

7. The cloud computing system of claim 6, wherein in response to invoking the device migration mode, the storage encryption layer removes a key association between the at least one virtual device key and the first virtual server and establishes a new key association between the at least one virtual device key and the second virtual server.

8. A method of securing data exchanged in a cloud computing system, the method comprising:

receiving, by at least one virtual server, one or both of a write request signal and a read request signal, wherein the at least one virtual server outputs non-encrypted data in response to receiving the write request signal the virtual server, and receives decrypted data in response to receiving the read request signal the virtual server;

receiving, by a hosting server hypervisor, the write request signal and the read request signal, wherein the hosting server hypervisor writes encrypted data corresponding to the write request signal into a storage device in response to receiving the write request signal the hosting server hypervisor, and obtains encrypted corresponding to a data read request signal from the storage device and outputs the outputs the encrypted data in response to receiving the read request signal the hosting server hypervisor; and storing, by a secure channel sub-system installed between the virtual server and the hosting server hypervisor, at least one virtual device key; and preventing, by the secure channel sub-system, both the virtual server and the hosting server hypervisor from accessing a key storage unit.

9. The method of claim 8, wherein preventing both the virtual server and the hosting server hypervisor from accessing the key storage unit comprises:

storing, by a secure key persistent storage unit, the at least one virtual device key received from a customer;

obtaining, by a secure key volatile storage unit the at least one virtual device key from the secure key persistent storage unit;

relaying, by a storage encryption layer, the data write request signal or the data read request signal to the secure key volatile storage unit; and obtaining the virtual device key from the secure key volatile storage unit in response to relaying the data write request signal or the data read request signal.

10. The method of claim 9, further comprising encrypting, via the storage encryption layer, the non-encrypted data using the virtual device key to generate the encrypted data corresponding to the data write request.

11. The method of claim 10, further comprising:

delivering, by the storage encryption layer, the encrypted data corresponding to the data write request to the hosting server hypervisor; and writing, via the hosting server hypervisor, the encrypted data into the storage device.

12. The method of claim 10, further comprising:

obtaining, via the storage encryption layer, the encrypted data corresponding to the data read request from the storage device; and decrypting, via the storage encryption layer, the encrypted data using the virtual device key to generate the decrypted data.

13. The method of claim 9, further comprising invoking, via the storage encryption layer, a device migration mode to perform a data migration from a first virtual server to a second virtual server different from the first virtual server in response to receiving a migration activation signal.

14. The method of claim 13, wherein invoking the device migration mode further comprises:

removing, via the storage encryption layer, a key association between the at least one virtual device key and the first virtual server; and establishing a new key association between the at least one virtual device key and the second virtual server.

15. A computer program product comprising a computer readable storage medium having program instructions embodied therewith the program instructions executable by a computer processor to cause the computer processor to perform a method comprising:

receiving, by at least one virtual server, one or both of a write request signal and a read request signal, wherein the at least one virtual server outputs non-encrypted data in response to receiving the write request signal the virtual server, and receives decrypted data in response to receiving the read request signal the virtual server;

receiving, by a hosting server hypervisor, the write request signal and the read request signal, wherein the hosting server hypervisor writes encrypted data corresponding to the write request signal into a storage device in response to receiving the write request signal the hosting server hypervisor, and obtains encrypted corresponding to the data read request signal from the storage device and outputs the outputs the encrypted data in response to receiving the read request signal the hosting server hypervisor; and storing, by a secure channel sub-system installed between the virtual server and the hosting server hypervisor, at least one virtual device key; and preventing, by the secure channel sub-system, both the virtual server and the hosting server hypervisor from accessing a key storage unit.

16. The computer program product of claim 15, wherein preventing both the virtual server and the hosting server hypervisor from accessing the key storage unit comprises:
- storing, by a secure key persistent storage unit, the at least one virtual device key received from a customer;
- obtaining, by a secure key volatile storage unit the at least one virtual device key from the secure key persistent storage unit;
- relaying, by a storage encryption layer, the data write request signal or the data read request signal to the secure key volatile storage unit; and
- obtaining the virtual device key from the secure key volatile storage unit in response to relaying the data write request signal or the data read request signal.

17. The computer program product of claim 16, further comprising encrypting, via the storage encryption layer, the non-encrypted data using the virtual device key to generate the encrypted data corresponding to the data write request.

18. The computer program product of claim 17, further comprising:
- delivering, by the storage encryption layer, the encrypted data corresponding to the data write request to the hosting server hypervisor; and
- writing, via the hosting server hypervisor, the encrypted data into the storage device.

19. The computer program product of claim 17, further comprising:
- obtaining, via the storage encryption layer, the encrypted data corresponding to the data read request from the storage device; and
- decrypting, via the storage encryption layer, the encrypted data using the virtual device key to generate the decrypted data.

20. The computer program product of claim 16, further comprising invoking, via the storage encryption layer, a device migration mode to perform a data migration from a first virtual server to a second virtual server different from the first virtual server in response to receiving a migration activation signal;
- removing, via the storage encryption layer, a key association between the at least one virtual device key and the first virtual server; and
- establishing a new key association between the at least one virtual device key and the second virtual server.

* * * * *